United States Patent [19]

Hochberg et al.

[11] Patent Number: 4,732,921

[45] Date of Patent: Mar. 22, 1988

[54] FLAME RETARDANT POLYBUTYLENE TEREPHTHALATE

[75] Inventors: Arie Hochberg, Montclair; Nancy C. Eickman, Mountainside; Frank Haimbach, IV, Montclair, all of N.J.

[73] Assignee: Hoechst Celanese Corporation, Chatham, N.J.

[21] Appl. No.: 938,198

[22] Filed: Dec. 5, 1986

[51] Int. Cl.[4] .......................... C08K 3/22; C08K 67/02
[52] U.S. Cl. .................................... 523/460; 524/410; 524/411; 525/438
[58] Field of Search ................. 525/438; 524/410, 411; 523/460

[56] References Cited

U.S. PATENT DOCUMENTS

| | | | |
|---|---|---|---|
| 3,909,485 | 9/1975 | Hongo et al. | 260/40 R |
| 3,912,792 | 10/1975 | Touval | 260/863 |
| 3,929,908 | 12/1975 | Orlando et al. | 260/620 |
| 3,957,905 | 5/1976 | Sumoto et al. | 260/860 |
| 3,965,212 | 6/1976 | Kamada et al. | 260/835 |
| 4,221,893 | 9/1980 | Behar et al. | 525/438 |
| 4,222,926 | 9/1980 | Mizuno et al. | 260/40 R |
| 4,548,964 | 10/1985 | Yoshida et al. | 523/455 |
| 4,562,216 | 12/1985 | Kishida et al. | 523/433 |

FOREIGN PATENT DOCUMENTS

| | | |
|---|---|---|
| 149190 | 7/1985 | European Pat. Off. |
| 2757557 | 6/1978 | Fed. Rep. of Germany . |
| 58-118849 | 7/1983 | Japan . |
| 59-149954 | 8/1984 | Japan . |

OTHER PUBLICATIONS

"A New Brominated Polymeric Additive for Flame Retardant Glass-Filled Polybutylene Terephthalate", Journal of Fire Retardant Chemistry, vol. 9, (Aug. 1982), p. 181.

Primary Examiner—Veronica P. Hoke
Attorney, Agent, or Firm—Depaoli & O'Brien

[57] ABSTRACT

A flame-resistant polybutylene terephthalate molding composition has vastly improved fatigue strength and improved melt flow by incorporating therein a halogenated epoxy flame retardant represented by the general formula:

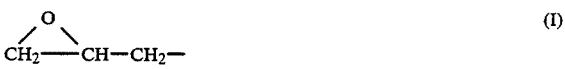

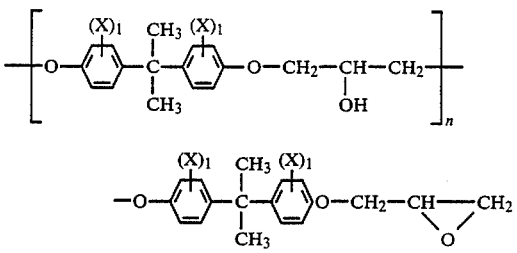

wherein an n is the degree of polymerization and the halogenated epoxy resin has a molecular weight of at least about 20,000 to 40,000; X is a chlorine or bromine atom, and i is an integer of from 1–4.

20 Claims, No Drawings

FLAME RETARDANT POLYBUTYLENE TEREPHTHALATE

BACKGROUND OF THE INVENTION

The present invention relates to flame retardant additives to be used in conjunction with polyalkylene terephthalate molding resins. More particularly, the present invention relates to flame resistant polybutylene terephthalate molding resins having improved toughness containing, as a flame retardant, a high molecular weight halogenated epoxy resin and an antimony-containing flame retardant synergist.

Polybutylene terephthalate and reinforced polybutylene terephthalate molding resins have been found to be surprisingly superior to polyethylene terephthalate in many important processing and performance characteristics. For example, polybutylene terephthalate can be molded and otherwise processed at lower temperatures, have a shorter cycle time in the mold and do not require, as does polyethylene terephthalate, the presence of a nucleating agent to induce crystallinity. Furthermore, reinforced polybutylene terephthalate molding resins have correspondingly higher tensile strength, lower water absorption and better creep (flexural) properties than does similarly reinforced polyethylene terephthalate. As a direct result, these polybutylene terephthalate molding resins which were first disclosed, along with polyethylene terephthalate in U.S. Pat. No. 2,465,319 to Whinfield and Dickson, have been found to solve processing problems long associated with polyethylene terephthalate and believed, by those skilled in the art to be equally associated with all polyalkylene terephthalates Equally as significant, these molding resins present a noticeably improved balance of performance properties which those skilled in the art, did not believe to exist. Consequently, the superior processing requirements and physical properties of polybutylene terephthalate molding resins makes them more commercially desirable, with a wider area of applicability than polyethylene terephthalate.

These molding resins do, however, have one considerable drawback-they are flammable. Quite significantly, the presence of many important reinforcing agents, such as glass, enhances rather than deters the burning rate of these molding resins. Since the reinforcing agents have a direct effect on the desirable physical and mechanical properties of these molding resins, several commercially advantageous applications are precluded.

It is well known in general that halogen-substituted aromatic compounds are effective as flame retardants for thermoplastic resins, particularly those which are required to be molded at elevated temperatures. Thus, a variety of halogen-substituted aromatic compounds and polymers have been suggested as flame retardants for polyalkylene terephthalates, including polybutylene terephthalate. For example, tetrabromophthalic anhydride, tetrabromobisphenol ether, decabromobiphenol ether, hexabromobiphenol and brominated bisphenol-A as well as brominated polycarbonates formed from brominated bisphenol-A and phosgene have all been suggested as flame retardants for polybutylene terephthalate. Typically, the fire retardant package for the thermoplastic polyester molding compositions includes a halogenated aromatic fire-retardant such as listed above and a flame retardant synergist, most notably antimony trioxide. Brominated aromatic fire retardants for polyester resins including polybutylene terephthalate are disclosed in U.S. Pat. Nos. 3,873,491 and 3,936,400.

Recently, it has been suggested to incorporate a brominated epoxy resin as a flame retardant for polybutylene terephthalate molding compositions. A useful brominated epoxy resin is one formed by reacting tetrabromobisphenol-A and epichlorohydrin. This is exemplified in U.S. Pat. No. 3,965,212 wherein tetrabromobisphenol-A, optionally non-brominated bisphenol-A and epichlorohydrin are reacted to form a glycidyl ether-end capped brominated resin useful as a flame retardant for polybutylene terephthalate. A flame retardant synergist such as antimony trioxide is also added. The epoxy resins which are disclosed in U.S. Pat. No. 3,965,212, however, are of relatively low molecular weight having at most about 11 repeating units of the bisphenol-A-containing ether. Other patents which teach improving the flame resistance of polybutylene terephthalate with the brominated epoxy resins described above together with other brominated aromatic compounds include U.S. Pat. Nos. 3,909,485; 4,548,964; and 4,562,216.

In European Patent Application No. 0149190, published July 24, 1985, it is suggested to add a brominated aromatic flame retardant including tetrabromobisphenol-A bisdiglycidyl ethers to a co-polyetherester resin which comprises long-chain ester units derived from dicarboxylic acids and polyalkylene oxide glycols having a molecular weight of from about 400 to 6,000 and short-chain ester units derived from a dicarboxylic acid and low molecular weight diols. The brominated epoxies are described as having an epoxy equivalent of from about 1,700 to about 2,100 g/eq and a molecular weight of from about 2,000 to 30,000. Especially preferred are the F-2300 diglycidyl-type polymers having about 50% aromatic bound bromine as produced by Makhtashim Chemical Works, Ltd., Beer Sheba, Israel. The F-2300 flame retardant is described in the *Journal of Fire Retardant Chemistry*, Volume 9 (August, 1982), pp. 181–7. In this journal article, glass-filled polybutylene terephthalate is mixed with the F-2300 flame retardant brominated epoxy which is described as having a molecular weight of from 3,800 to 4,000. It is believed the F-2300 flame retardant is marketed by M & T Chemicals under the tradename Thermoguard 230.

Highly brominated bisphenol-A epoxy resins are also described in U.S. Pat. No. 4,221,893 assigned to Makhtashim. The brominated bisphenol-A epoxy resins disclosed therein are produced by reacting epichlorohydrin with the residue remaining after the formation of tetrabromobisphenol-A. These resins are described as flame retardant additives for polymers including thermosetting polyester resins.

It has been found that many of the aforementioned brominated flame retardants have the drawback that when the same are added to polybutylene terephthalate and the mixture subjected to molding, the resulting molded articles are greatly deteriorated in mechanical properties, particularly toughness. The brominated epoxy resins disclosed in U.S. Pat. No. 3,965,212, however, are described in the patent as imparting excellent mechanical properties to polybutylene terephthalate. Unfortunately, applicants have recently discovered that polybutylene terephthalate compositions containing the brominated epoxy resin disclosed in U.S. Pat. No. 3,965,212 show a marked decrease in melt flow relative to the polyester without the flame retardant. It is theorized that the low molecular weight brominated epoxy flame retardant is involved in intermolecular crosslinking with the polybutylene terephthalate.

In molding large articles or articles with complicated structures, it is important that the melt flow of the thermoplastic polyester be sufficient so as to allow the molten resin to uniformly fill the mold cavities without the need of substantially increased pressure and/or of modifying the molding equipment with consequent added expense to accommodate highly viscous molding compositions. Excessive molding pressure to accomodate highly viscous molding compositions may also lead to localized areas of frozen-in stress in the formed article since it is unlikely that the pressure will even itself out in a filled mold and, thus, excessive pressure is to be avoided. Obviously, the lower the viscosity of the plastic melt, the less will be the pressure needed to convey the molding resin into the mold fully and evenly. Accordingly, it is a distinct disadvantage that the incorporation of additives including the flame retardant additives sacrifice the melt flow of the molding resin composition.

Accordingly, it is a primary objective of the present invention to provide a flame resistant polybutylene terephthalate molding composition having improved toughness.

It is another object of the present invention to provide a flame resistant polybutylene terephthalate molding composition of improved melt flow characteristics.

It is still another object of the present invention to provide a brominated epoxy resin as a flame retardant which when added to polybutylene terephthalate molding compositions does not degrade the toughness of the molded article or disadvantageously affect the melt flow characteristics of the molding composition.

These and other objects and aspects of the present invention will be readily understood by those of ordinary skill in the art upon consideration of the following description of the invention together with the appended claims.

SUMMARY OF THE INVENTION

In accordance with the present invention, polybutylene terephthalate (PBT) is successfully made flame resistant without deteriorating the excellent mechanical properties, particularly toughness, inherent thereto and without adversely effecting the other resin characteristics such as melt flow by adding thereto a flame retardant represented by general formula I.

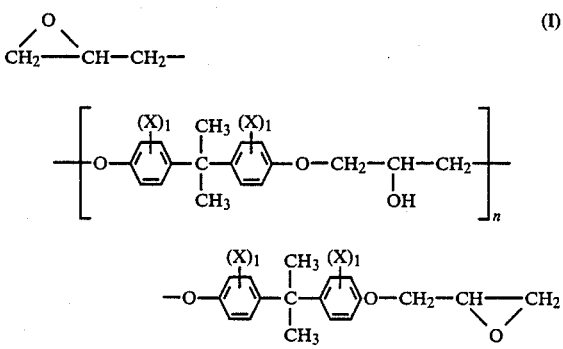

wherein n is an integer describing the degree of polymerization and is sufficient to provide a molecular weight of from about 20,000 to about 40,000, e.g., at least 32; X is a bromine or chlorine atom; and i may be the same or different for each aromatic substituent and is an integer of 1 to 4.

In accordance with the invention, there is provided a flame resistant resin composition comprising 40 to 90 parts by weight polybutylene terephthalate, 0 to 50 parts by weight glass fibers, 5 to 20 parts by weight of the halogenated bisphenol-A diglycidyl ether polymer as set forth in general formula I, and 1 to 10 parts by weight of an antimony-containing flame retardant synergist. The flame resistant polybutylene terephthalate molding composition of the present invention has vastly improved fatigue strength relative to other flame resistant PBT molding compositions utilizing other halogenated aromatic flame retardants and has improved melt flow characteristics relative to fire resistant PBT molding compositions which contain as the flame retardant therefor lower molecular weight, brominated epoxy resins.

DETAILED DESCRIPTION OF THE INVENTION

The molding resins of this invention are based on a polybutylene terephthalate polymer. This polymer is of the general type described in U.S. Pat. No. 2,465,319 to Whinfield and Dickson, and can be produced from the reaction product of a dibasic acid, such as terephthalic acid or a dialkyl ester of terephthalic acid (especially dimethyl terephthalate), and diols having 4 carbon atoms. Suitable diols include 1,4-butanediol, 1,3-butanediol, 1,2-butanediol, 2,3-butanediol and the like.

As is well known in the art, in the production of polybutylene terephthalate, the appropriate bis (hydroxyalkyl) terephthalate is produced as the intermediate. The bis (hydroxyalkyl) terephthalate can be prepared by reacting the dialkyl ester of terephthalic acid in which the alkyl radicals can contain from 1 to 7 carbon atoms with about two molecular proportions of the diols described above. It is preferred to use higher proportions of the diol, i.e., in excess of 1.5 moles of the diol per mole of the terephthalate derivative, since by using such proportions, the initial transesterification is caused to take place more rapidly and completely.

The reaction for the esterification is conducted under conditions of elevated temperatures and atmospheric, subatmospheric or superatmospheric pressure. Normally, the desired temperatures of the reaction can range from about the boiling temperature of the reaction mixture to as high as 250° C., if desired.

The molding composition of the present invention is preferably based on polybutylene terephthalate which will be present in amounts of about 40 to about 90 wt. % of the composition. The intrinsic viscosity of the polybutylene terephthalate is preferably in the range of 0.4 to 5.0 dl/g, and more preferably in the range of from 0.6 to 3.0 dl/g.

The balance of the composition will comprise the brominated epoxy resin flame retardant, flame retardant synergist, fillers and other additives which are used to promote stability and moldability of the composition. Further, the molding composition may contain a polyalkylene terephthalate other than polybutylene terephthalate. Preferably, the additional polyester will be polyethylene terephthalate. Accordingly, 0–40 wt. % of the molding composition can comprise polyalkylene terephthalate such as polyethylene terephthalate in addition to polybutylene terephthalate.

The flame retardant which is added to the polybutylene terephthalate molding composition has the structure represented by general formula I above and is obtained, for example, by the condensation of epichlorohydrin with tetrabromobisphenol-A. The epoxy resin flame retardant preferably comprises about 50 percent aromatically bound halogen, preferably, bromine. Accordingly, referring to general formula I, preferably, X is bromine, and i is the same for each aromatic substituent and is equal to about 2. In formula I, n indicates the average degree of polymerization and is an integer of at least about 32 to 65 such that the molecular weight of the flame retardant epoxy resin is at least about 20,000 to 40,000.

The molecular weight of the epoxy resin flame retardants of this invention is a critical feature as it has been found that articles molded from polybutylene terephthalate containing the higher molecular weight flame retardants of the present invention are not only imparted with vastly improved toughness as shown by impact and tensile strengths as compared to molded PBT articles containing other halogenated aromatic flame retardants, but, the compositions are also provided with a sufficient melt flow. On the other hand, PBT molding compositions containing halogenated epoxy resins of lower molecular weight such as set forth in U.S. Pat. No. 3,965,212, have decreased melt flow, especially when the compositions are allowed to stand for even short periods of time. The intermolecular crosslinking between the lower molecular weight epoxy resins of U.S. Pat. No. 3,965,212 and the PBT which is believed to reduce the melt flow of such compositions is not found when the high molecular weight halogenated epoxy flame retardants of the present invention are used.

The molecular weight of the brominated epoxy resin can be regulated by the molar ratio of reactants which are used in the condensation reaction to form the resin. Thus, increasing the amount of epichlorohydrin relative to the tetrabromobisphenol-A, tends to reduce the molecular weight of the epoxy resin which is formed and likewise decreasing the relative amount of epichlorohydrin results in increasing the molecular weight of the epoxy resin. An alternative method of forming a brominated epoxy resin useful in the present invention is set forth in U.S. Pat. No. 4,221,893 where the residue from the formation of tetrabromobisphenol-A is reacted with epichlorohydrin. This residue is substantially tetrabromobisphenol-A but may include other impurities such as brominated bisphenol-A at various stages of bromination, brominated phenols resulting from the cleavage of bisphenol and other small amounts of bromine containing oxidation products produced by side reactions during the bromination process. The mentioned patent is herein incorporated by reference. Again, molecular weight can be regulated by controlling the relative molar amount of epichlorohydrin contained in the reaction medium. In accordance with this invention, molar epichlorohydrin levels below those described in U.S. Pat. No. 4,221,893 would be appropriate. Commercial brominated epoxy resin flame retardants are available including the Thermoguard series from M&T Chemicals, including Thermoguard 240 which has a molecular weight of 40,000.

The amount of the flame retardant to be added to the molding composition is properly determined according to the desired extent of flame resistance, and is preferably added in a range of about 5 to 20% by weight relative to the total polybutylene terephthalate molding composition. If the amount of flame retardant is too small, a sufficient flame resistance cannot be attained while if the amount thereof is too large, the beneficial characteristics of the molding resin is undesirably deteriorated.

Along with the halogenated epoxy resin flame retardant which has been discussed above, there is added to the composition a flame retardant synergist comprising antimony. Preferably, antimony trioxide is used in combination with the flame retardant of formula I. The flame retardant synergist is preferably added in amounts ranging from about 1 to 10% by weight relative to the total polybutylene terephthalate molding composition.

In preparing the composition of the present invention, there may be adopted such a procedure that a flame retardant of the formula I and antimony trioxide are added to a molten polybutylene terephthalate during or after polymerization reaction, or added to chips of the polybutylene terephthalate. For example, sufficiently dried polybutylene terephthalate in the form of chips, a flame retardant of formula I and antimony trioxide can be blended together and the resulting mixture then kneaded by means of an extruder or the like.

Optionally, reinforcing agents can be intimately blended with the polybutylene terephthalate by either dry blending or melt blending, blended in extruders, heated rolls or other types of mixers. If desired, the reinforcing agents can be blended with monomers in the polymerization reaction as long as the polymerization reaction is not effected. Alternatively, the reinforcing agent can be added after polymerization and prior to extrusion. The types of reinforcing agents which can be used include among others glass fibers (chopped or continuous rovings) asbestos fibers, cellulosic fibers, cotton fabric paper, synthetic fibers, metallic powders and the like. The amount of reinforcing agent can range from about 0 to about 50 weight percent, preferably from about 5 to about 40 weight percent based on the total molding composition. Glass fibers are the preferred reinforcing agent.

Glass reinforced polybutylene terephthalate resins have important advantages over the equivalent glass reinforced polyethylene terephthalate. Compared to polyethylene terephthalate, polybutylene terephthalate can be processed at much lower temperatures, at a significantly lower cycle time and with a lower mold temperature. In addition they have noticeably higher notched Izod and tensile impact, less shrinkage and lower water absorption than does polyethylene terephthalate. All of these improved processing and physical characteristics of the glass reinforced polybutylene terephthalate resins are highly desirable having direct commercial ramifications, when compared to equivalent glass reinforced polyethylene terephthalate resin.

In addition to the components discussed here and above, the blends of this invention may contain additives commonly employed with polyester resins, such as colorants, mold release agents, antioxidants, tougheners, ultra violet light and heat stabilizers, plasticizers, and the like.

The resin composition of the present invention has excellent mechanical properties, thermal properties, and moldability, and has excellent flame resistance. In particular, the flame retardant PBT composition of this invention has greatly improved toughness relative to flame retardant PBT compositions containing other halogenated aromatic flame retardants. Importantly, the PBT molding composition of the present invention has an improved melt flow relative to PBT compositions which contain brominated epoxy resins having up to 10 or 11 repeating units such as disclosed in U.S. Pat. No. 3,965,212 which are of relatively low molecular weight. The melt flow of the molding resin is an important characteristic allowing for the precise molding of relatively large components or small components of variegated configuration. An adequate melt flow allows the mold cavity to be fully and uniformly filled. The use of the lower molecular weight brominated epoxy flame retardants as disclosed in U.S. Pat. No. 3,965,212 have been found to drastically reduce melt flow of the PBT composition.

The following examples illustrate the improved flame resistance, toughness and melt flow properties which are obtained utilizing the high molecular weight halogenated epoxy resin flame retardant set forth in the description of the invention. The following tests were performed on the sample compositions and molded samples therefrom.

In order for a material to attain the self-extinguishing grades V-0 and V-1 regulated in the flammability test according to Underwriters' Laboratories Bulletin 94 (hereinafter abbreviated to "UL-94"), the material is required to have a short combustion time and not to ignite cotton placed below the material due to dripping caused at the time of combustion. Accordingly, not only the combustion time but also the shape variation and dripping when the material is exposed to flame should sufficiently be taken into consideration. For example, when a material is exposed to flame, if a part of the material in the neighborhood of the ignition place falls down as a chunk, the cotton placed below the material tends to ignite, and if the material fuses owing to the flame before extinguishment drips, the cotton also tends to ignite. In order to prevent such a spread of flame, it is necessary to impart to the material such a property as not to drip even when exposed to flame or such a property as not to ignite the cotton even when allowed to drip.

The ease of flow of the molding composition can be determined by its melt index. Melt index is determined by heating a sample of a polymer in a standard cylinder to a standard temperature of 250° C. and forcing it under a standard load of 2.160 kg. through a standard orifice of 0.0825 inch diameter and 0.315 inch long for a standard period and weighing the polymer passing through the orifice during this period. The results are recorded in grams per 10 minutes. The test is described in detail in ASTM D-1238-57T.

A further test to determine the melt flow of the molding composition is the method of spiral flow molding. This test involves molding into an open-ended channel marked off in centimeters or inches, and arranged, for convenience, in the form of an archimedean spiral. The results are shown in the amount of inches the molding resin flows at specified temperature and pressure.

Tensile strength and elongation were measured on injection molded bars by ASTM method D638.

Flex strength and flex modulus were tested by ASTM method D790.

The notched izod impact strength was determined by ASTM method D256.

Heat Distortion Temperature (HDT) was determined by ASTM method D-648.

Fatigue testing of the sample was accomplished in tension at IHZ and 80% of the original ASTM D638 yield stress. The testing was continued until the sample failed or $1 \times 10^6$ cycles were imposed on the sample.

EXAMPLE 1

Five flame retardant PBT blends were mixed and extruded into samples for testing mechanical and flame resistant properties according to standardized test procedures. The compositions of blends A-E are shown in Table 1 below along with the results of the evaluations. In particular, the flame retardant brominated epoxy resin within the scope of the present invention was compared with a brominated phenoxy compound flame retardant.

Compounding of all composition blends was performed on a 2½ inch Egan extruder (2-stage vented, 30:1 L/D screw). Conditions used were about 500° F. on all zones and 80 rpm screw speed, with vacuum on vent to remove volatiles during extrusion.

Molding into the test bars was done on a 4 oz. Cincinnati Milicron. Molding conditions used were as follows:

| Melt Temperature | 470°–490° F. |
| Mold Temperature | 180° F. |
| Screw Speed | 100 rpm |
| Injection Pressure | 6,000–8,000 psi. |

TABLE 1

| Composition wt. % | A | B | C | D | E |
| --- | --- | --- | --- | --- | --- |
| PBT[a] | 48.3 | 49.3 | 51.2 | 52.2 | 49.2 |
| PBT/Teflon K (10/1) | 5.5 | 5.5 | 5.5 | 5.5 | |
| Antimony oxide | 5.5 | 5.5 | 5.5 | 5.5 | |
| Acrowax C | 0.3 | 0.3 | 0.3 | 0.3 | 0.3 |
| Phenoxy stabilizer | 1.0 | — | 1.0 | — | 1.0 |
| Brominated epoxy resin[1] | 9.0 | 9.0 | | | |
| Tetradecabromodiphenoxy benzene[2] | | | 6.5 | 6.5 | |
| Phosphite stabilizer[3] | 0.2 | 0.2 | | | 0.2 |
| Phenolic stabilizer[4] | 0.2 | 0.2 | | | 0.2 |
| Brominated epoxy resin[1] + antimony oxide | | | | | 13.6 |
| Glass fibers | 30.0 | 30.0 | 30.0 | 30.0 | 30.0 |
| Properties | | | | | |
| Color | gray | gray | white | white | white |
| Tensile strength, psi | 18,022 | 17,440 | 17,310 | 16,650 | 18,940 |
| Unnotched Izod, ft-lb/in | 12.54 | 12.10 | 12.82 | 11.67 | 13.80 |
| Flexural Strength, psi | 28,760 | 27,730 | 28,100 | 26,540 | 29,420 |
| Flexural modulus, psi × 10^6 | 1.35 | 1.32 | 1.35 | 1.31 | 1.33 |
| Notched Izod ft-lb/in | 1.24 | 1.15 | 1.33 | 1.30 | 1.30 |
| Flame resistance | | | | | |
| UL-94 (1/32 inch bar) | V-0 | V-0 | V-2 | V-2 | V-0 |
| Average burn time (seconds) | .91 | .96 | .99 | .91 | 1.03 |
| UL-94 (1/64 inch bar) | V-0 | V-0 | V-2 | V-2 | V-0 |
| Average burn time (seconds) | .93 | .94 | 3.31 | 1.43 | 1.01 |

[1] Thermoguard 240, M & T Chemicals, Molecular Weight = 40,000
[2] Saytex - 120, Ethyl Corporation
[3] Ultranox 626, Borg-Warner
[4] Irganox 1010, Ciba-Geigy
[a] 0.7 I.V.

As can be seen from Table 1, the PBT compositions containing the brominated epoxy resin flame retardant within the scope of the present invention had improved physical properties, in particular, tensile and flexural strength as compared to PBT compositions containing the comparative brominated flame retardant. Importantly, the compositions containing the flame retardant of the present invention had vastly improved flame resistance.

EXAMPLE 2

In this example, various unfilled PBT flame retardant compositions were evaluated for mechanical and flame resistant properties. Samples F, G, H and I represent substantially the same compositions with the only difference being the particular flame retardant tested. Samples G and H tested brominated epoxy resins. Sample H contained a brominated epoxy resin having a molecular weight within the scope of the present invention whereas in Sample G, the brominated epoxy resin had a molecular weight of up to about 4,000. The compositions of each molding sample and the evaluation of the properties are shown in Table 2. Compounding of all composition blends was done as in Example 1.

TABLE 2

| Composition wt. % | F | G | H | I |
|---|---|---|---|---|
| PBT[b] | 82.7 | 80.3 | 80.3 | 82.7 |
| PBT/Teflon K (10/1) | 3.0 | 3.0 | 3.0 | 3.0 |
| Decabromodiphenyl ether | 10.0 | | | |
| Brominated epoxy resin[1] | | 12.0 | | |
| Brominated epoxy resin[2] | | | 12.0 | |
| Tetradecabromodiphenoxy benzene[3] | | | | 10.0 |
| Antimony oxide | 4.0 | 4.0 | 4.0 | 4.0 |
| Acrowax | 0.3 | 0.3 | 0.3 | 0.3 |
| Phosphite stabilizer[4] | | 0.2 | 0.2 | |
| Phenolic stabilizer[5] | | 0.2 | 0.2 | |
| Properties | | | | |
| Tensile strength at yield, psi | 9,280 | 8,779 | 8,410 | 7,922 |
| Tensile strength at break, psi | 8,789 | 7,844 | 7,830 | 7,510 |
| % elongation | 8 ± 4 | 21 ± 2 | 11 ± 10 | 6 ± 8 |
| Notched izod | 0.48 | 0.54 | 0.78 | 0.66 ± 0.13 |
| Unnotched izod, | 8.1 ± 1.4 | 22 ± 9 | 32 ± 3 | 9 ± 4 |
| Gardner Impact 2" discs, in-lbs (pass/fail) | 10/12.5 | 25/30 | 35/40 | 5/7.5 |
| Flame resistance | | | | |
| UL-94 (1/32) | V-2 | V-0 | V-0 | V-0 |
| Average Burn time (sec.) | 1.86 | 1.90 | 1.89 | 1.08 |

[1]Thermoguard 230, M & T Chemicals, molecular weight = 4,000
[2]Thermoguard 240, M & T Chemicals, molecular weight = 40,000
[3]Saytex - 120, Ethyl Corporation
[4]Ultranox 626, Borg Warner
[5]Irganox 1010, Ciba-Geigy
[b]1.0 I.V.

Again, the PBT composition containing the brominated epoxy resin flame retardant within the scope of the present invention had improved tensile strength and improved impact strength relative to the comparative compositions. The flame resistance of the unfilled compositions containing the flame retardant of the present invention was excellent.

EXAMPLE 3

The unfilled PBT compositions of Example 2 were tested for fatigue strength. The results of the fatigue strength testing are shown in Table 3.

TABLE 3

| | FATIGUE STRENGTH | | | |
|---|---|---|---|---|
| | Load (lbs) | | % of | |
| Sample | Low | High | Yield | Cycles to Failure |
| F | 50 | 460 | 80 | 13,400 |
| F | 50 | 460 | 80 | 4,100 |
| F | 50 | 460 | 80 | 6,100 |

TABLE 3-continued

| | FATIGUE STRENGTH | | | |
|---|---|---|---|---|
| | Load (lbs) | | % of | |
| Sample | Low | High | Yield | Cycles to Failure |
| F | 50 | 460 | 80 | 11,000 |
| G | 50 | 443 | 80 | 454,800 |
| G | 50 | 443 | 80 | 552,100 |
| H | 50 | 429 | 80 | 53,200 |
| H | 50 | 429 | 80 | 1,000,000* |
| H | 50 | 429 | 80 | 1,000 |
| H | 50 | 429 | 80 | 1,200 |
| H | 50 | 429 | 80 | 1,800 |
| I | 50 | 409 | 80 | 3,600 |
| I | 50 | 409 | 80 | 2,500 |
| I | 50 | 409 | 80 | 3,100 |
| I | 50 | 409 | 80 | 4,500 |

*Test terminated at 1,000,000 cycles

As can be seen from Table 3, the PBT compositions containing the brominated epoxy resin flame retardants had vastly improved fatigue strength over the comparative compositions. It should be noted that the diversity of the results obtained in Sample H containing the epoxy resin flame retardant within the scope of the present invention is not uncommon in this type of test since even small nonhomogenities within the sample bar have a large effect on the fatigue properties. Accordingly, a single high value in the fatigue test is indicative of the improved fatigue properties of a given sample. It is important to note that the base PBT has a fatigue strength of at least about 2,000 cycles, but never exceeds 5,000 cycles. Thus, the results shown in the fatigue test of the PBT compositions containing the epoxy resin flame retardant indicate vastly improved PBT fatigue strength.

EXAMPLE 4

The spiral flow molding of various PBT compositions was examined. Samples J and K were identical to samples A and B, respectively, except that the epoxy resin flame retardant utilized was Thermoguard 230 having a molecular weight of 4,000. Sample L was equivalent to Sample J with the only difference being in the brand of glass fibers utilized in the composition. Sample M had the equivalent composition as Sample K. Sample N was a 30% glass filled PBT containing a decabromodiphenyl ether flame retardant. Sample O was a 30% glass filled PBT containing a brominated polystyrene flame retardant. Sample P was a commercial PBT composition from G.E. comprising a 30% glass filled PBT. The results are shown in Table 4.

TABLE 4

| | SPIRAL FLOW MOLDING[1] | |
|---|---|---|
| Sample | Inches[2] at 6,000 psi | Inches[2] at 12,000 psi |
| A | 25 ± 0.2 | 32 ± 1 |
| C | 23 ± 0.5 | 43 ± 2 |
| J | 10 → 6 | 10 → 6 |
| K | 15 ± 1 | 25 ± 1 |
| L | 15 → 5 | 8½ → 7 |
| M | 14 ± 0.3 | 24 ± 0.2 |
| N | 31 ± 1 | 40 ± 1 |
| O | 33 ± 1 | 48 ± 1 |
| P | 23 ± 1 | 34 ± 0.7 |

[1]475° F.
[2]Average of 10 cycles

As can be seen in comparing samples A and J, the PBT composition containing the higher molecular weight epoxy resin flame retardant had substantially improved melt flow. Moreover, melt flow of samples J and L actually began to decrease as the melt composition was allowed to stand.

EXAMPLE 5

Melt Index

Unfilled PBT composition samples G and H were compared for melt index. Results are shown in Table 5.

TABLE 5

| Sample | Dwell Time | M.W. of Epoxy F.R. | Melt Index |
|--------|-----------|--------------------|------------|
| G | 5 min. | 4,000 | 10.0 |
| G | 15 min. | 4,000 | 8 |
| G | 30 min. | 4,000 | 0.0 |
| H | 5 min. | 40,000 | 15.0 |
| H | 15 min. | 40,000 | 18 |
| H | 30 min. | 40,000 | 20.0 |

As can be seen in Table 5, the melt index of the PBT sample composition containing the low molecular weight brominated epoxy resin flame decreases as the melted composition sits prior to injection into the test cylinder. It is believed that the lower molecular weight epoxy resin flame retardant crosslinks with the PBT.

All samples tested in following Examples 6 and 7 were blended on a 2½ inch Johnson Extruder having substantially the same configuration as the Egan used in the previous examples. Mixing conditions as well as the molding conditions on a 6 oz. HPM molding machine were substantially identical to mixing and molding conditions used in Examples 1 and 2.

EXAMPLE 6

Various glass filled and unfilled PBT compositions were compounded and tested for toughness and flow properties. The samples compared PBT compositions containing brominated epoxy resin flame retardants in which the epoxy resins had varying molecular weights. The results are shown in Table 6.

TABLE 6

| Composition wt. % | AA | BB | CC | DD | EE | FF |
|---|---|---|---|---|---|---|
| PBT$^a$ | 49.5 | 49.5 | 49.5 | | | |
| Glass fiber | 30.0 | 30.0 | 30.0 | | | |
| PBT/Teflon (10/1) | 5.5 | 5.5 | 5.5 | 3.3 | 3.3 | 3.3 |
| Brominated Epoxy$^1$ | 9.0 | | | 12.0 | | |
| Antimony Oxide | 5.5 | 5.5 | 5.5 | 5.0 | 5.0 | 5.0 |
| Ultranox 626 | 0.2 | 0.2 | 0.2 | 0.2 | 0.2 | 0.2 |
| Lubricant | 0.3 | 0.3 | 0.3 | | | |
| Brominated epoxy$^2$ | | 9.0 | | | 12.0 | |
| Brominated epoxy$^3$ | | | 9.0 | | | 12.0 |
| PBT$^b$ | | | | 79.0 | 79.0 | 79.0 |
| Irganox 1010 | | | | 0.2 | 0.2 | 0.2 |
| Arcawax-C | | | | 0.3 | 0.3 | 0.3 |
| Properties | | | | | | |
| Color | lt. gray | lt. gray | white | | | |
| Spiral Flow (inches) | | | | | | |
| 4,000 psi | 12.8 | 21.2 | 17.9 | 17.8 | 18.6 | 19.3 |
| 12,000 psi | 34.2 | 37.9 | 40.4 | 27.0 | 32.9 | 32.2 |
| Tensile strength | 17,301 | 18,085 | 18,100 | 8,192 | 8,804 | 8,898 |
| Flex strength | 25,748 | 27,500 | 27,366 | 14,353 | 13,330 | 13,488 |
| Notched izod | 1.18 | 1.28 | 1.233 | 0.54 | 0.83 | 0.670 |
| Unnotched izod | 8.8 | 9.5 | 11.3 | 5.4 | 19.1 | 16.5 |
| Flex modulus | 1.42 | 1.42 | 1.423 | | | |
| % Elong. | | | | 2.3 | 7.8 | 6.3 |
| Flame Resistance | | | | | | |
| UL-94 (1/32) | V-0 | V-0 | V-0 | V-2 | V-0 | V-0 |
| UL-94 (1/64) | V-2 | V-0 | V-2 | V-2 | V-0 | V-0 |

$^a$0.7 I.V.
$^b$1.0 I.V.
$^1$Molecular Weight = 4,000
$^2$Molecular Weight = 40,000
$^3$Molecular Weight = 10,000

From Table 6, it can be seen there is significantly improved flow of those glass filled PBT samples containing epoxy resin flame retardants with molecular weights of 10,000 and 40,000 over the samples containing the low molecular weight epoxy resin flame retardant, e.g. 4,000. The spiral flow molding showed small differences in unfilled PBT samples DD, EE, and FF. Thus, the greatest advantage obtained with respect to melt flow upon using the higher molecular weight brominated epoxy resin as flame retardant is seen clearly in the glass reinforced samples. This has the greater significance inasmuch as the glass filled samples are more difficult to form into the desired molded article. The impact strength of PBT samples containing brominated epoxy resins within the scope of the invention is higher than the comparative samples.

EXAMPLE 7

Unfilled PBT samples were evaluated for mechanical properties and fire resistance. The results are shown in Table 7. The samples were pigmented in order to determine whether brominated epoxy resin flame retardants deteriorate pigmented PBT samples.

TABLE 7

| Composition Wt. % | GG | HH | II | JJ | KK | LL | MM | NN |
|---|---|---|---|---|---|---|---|---|
| PBT | 79.3 | 79.3 | 79.3 | 79.3 | 72.6 | 72.6 | 74.3 | 72.6 |
| PBT/Teflon (10/1) | 3.0 | 3.0 | 3.0 | 3.0 | 3.0 | 3.0 | 3.0 | 3.0 |
| Thermoguard 230 | 12.0 | | | 12.0 | 12.0 | 12.0 | 12.0 | 12.0 |
| Thermoguard 240 | | 12.0 | 12.0 | | | | | |
| Antimony Oxide | 5.0 | 5.0 | 5.0 | 5.0 | 5.0 | 5.0 | 5.0 | 5.0 |
| Acrawax C | 0.3 | 0.3 | | | 0.3 | 0.3 | 0.3 | 0.3 |
| Ultranox 626 | 0.2 | 0.2 | 0.2 | 0.2 | 0.2 | 0.2 | 0.2 | 0.2 |
| Irganox 1010 | 0.2 | 0.2 | 0.2 | 0.2 | 0.2 | 0.2 | 0.2 | 0.2 |
| Lubricant | | | 0.3 | 0.3 | | | | |
| Blue Pigment | | | | | 6.7 | | | |
| Blue Pigment | | | | | | 6.7 | | |
| Gray Pigment | | | | | | | 5.0 | |
| Red Pigment | | | | | | | | 6.7 |
| Properties | | | | | | | | |
| HDT at 264 (PSI) | 62 | 65 | | | | | | |
| Tensile break | 8,854 | 9,008 | 8,981 | 9,189 | 8,621 | 9,365 | 9,215 | 9,270 |

TABLE 7-continued

| Composition Wt. % | GG | HH | II | JJ | KK | LL | MM | NN |
|---|---|---|---|---|---|---|---|---|
| % Elongation | 2.8 | 10.8 | 5.7 | 3.66 | 2.546 | 3.92 | 3.99 | 3.28 |
| Flex strength | 14,241 | 13,749 | 13,313 | 13,594 | 14,269 | 13,965 | 13,914 | 14,000 |
| Flex modulus | 4.15 | 4.21 | 4.06 | 4.04 | 4.28 | 4.28 | 4.16 | 4.28 |
| Notched izod | 0.60 | 0.77 | 0.69 | 0.68 | 0.66 | 0.63 | 0.65 | 0.63 |
| Unnotched izod | 12.1 | 20.7 | 19.1 | 13.6 | 11.0 | 13.6 | 14.8 | 9.2 |
| Gardner Impact in-lbs | | | | | | | | |
| 2" discs pass | 5.0 | 13 | 7.5 | 10 | 5.0 | 7.5 | 15.0 | 5.0 |
| fail | 25.0 | 15.0 | 10.0 | 13.0 | 7.5 | 10.0 | 18.0 | 7.5 |
| Flame Resistance | | | | | | | | |
| UL-94 (1/32) | V-0 | V-2 | V-0 | V-0 | V-0 | V-0 | V-0 | V-0 |
| UL-94 (1/64) | V-0 | V-2 | V-0 | V-0 | V-0 | V-0 | V-0 | V-0 |

EXAMPLE 8

The melt index of GG and HH were compared to determine if the molecular weight of the brominated epoxy resin flame retardant effected the melt flow of the resin. The results are shown in Table 8.

TABLE 8

| Sample ID | Dwell Time | M.W. of BR. Epoxy | Melt Index |
|---|---|---|---|
| GG | 5 min. | 4,000 | 16.4 |
| GG | 15 min. | 4,000 | 11.1 |
| GG | 30 min. | 4,000 | 0.0 |
| HH | 5 min. | 40,000 | 11.4 |
| HH | 15 min. | 40,000 | 21.4 |
| HH | 30 min. | 40,000 | 35.2 |

From Table 8, it can clearly be seen that the melt index of the material containing the lower molecular weight brominated epoxy resin had decreased melt flow the longer the sample melt sat prior to injection into the testing cylinder. These results are consistent with those obtained in Example 5 and indicate that there is cross-linking between the lower molecular weight epoxy resin and PBT.

What is claimed is:

1. A molding composition comprising a polybutylene terephthalate and a halogenated flame retardant comprising a halogenated epoxy resin having the general structure of formula I

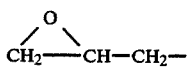

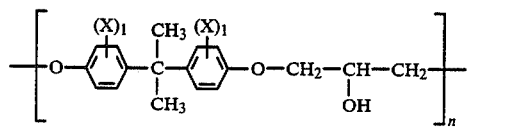

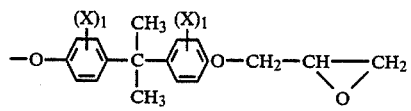

wherein n is an integer describing the degree of polymerization and is sufficient to provide said brominated epoxy resin with a molecular weight of at least about 20,000 to about 40,000; X is a chlorine or bromine atom; and i is the same or different for each aromatic substituent and is an integer of from 1–4.

2. The molding composition of claim 1 further including a flame retardant synergist comprising antimony.

3. The molding composition of claim 2 wherein said flame retardant synergist is antimony trioxide.

4. The molding composition of claim 1 further including glass fibers.

5. The molding composition of claim 1 comprising 40 to by weight polybutylene terephthalate, 0 to 50% by weight glass fibers, 5 to 20% by weight said halogenated epoxy resin flame retardant and 1 to 10% by weight of an antimony-containing flame retardant synergist.

6. The molding composition of claim 1 comprising 40 to 90% by weight polybutylene terephthalate, 0 to 50% by weight polyethylene terephthalate, 5 to 40% by weight glass fibers, and 5 to 20% by weight of said halogenated epoxy resin.

7. The molding composition of claim 6 further including a 1 to 10% by weight of an antimony-containing flame retardant synergist.

8. The molding composition of claim 7 wherein said flame retardant synergist is antimony trioxide.

9. The molding composition of claim 1 wherein X is bromine.

10. The molding composition of claim 1 wherein said halogenated epoxy resin has a molecular weight of about 40,000.

11. The molding composition of claim 4 wherein said halogenated epoxy resin has a molecular weight of about 40,000.

12. A molded article formed from the composition of claim 1.

13. The molded article of claim 12 wherein said molding composition comprises 40 to 90% by weight polybutylene terephthalate, 0 to 50% by weight glass fibers, 5 to 20% by weight said halogenated epoxy resin flame retardant and 1 to 10% by weight of an antimony-containing flame retardant synergist.

14. The molded article of claim 12 wherein said molding composition comprises 40 to 90% by weight polybutylene terephthalate, 0 to 50% by weight polyethylene terephthalate, 5 to 40% by weight glass fibers, 5 to 20% by weight of said halogenated epoxy resin.

15. The molded article of claim 14 wherein said molding composition includes 1 to 10% by weight antimony-containing flame retardant synergist.

16. The molded article of claim 12 wherein X is bromine.

17. The molded article of claim 12 wherein said epoxy resin has a molecular weight of about 40,000.

18. The molded article of claim 14 wherein said epoxy resin has a molecular weight of about 40,000.

19. A film formed from the molding composition of claim 1.

20. The film of claim 19 wherein X is bromine.

* * * * *

UNITED STATES PATENT AND TRADEMARK OFFICE
CERTIFICATE OF CORRECTION

PATENT NO. : 4,732,921

DATED : March 22, 1988

INVENTOR(S) : Arie Hochberg, Nancy C. Eickman, and Frank Haimbach, IV

It is certified that error appears in the above-identified patent and that said Letters Patent is hereby corrected as shown below:

In the Abstract, change the portion of the formula that reads as follows:

"  "    (both occurrences)

to:

-- 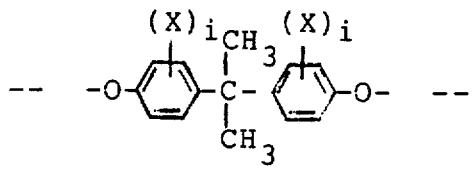 --

Column 3, line 55, change "$(X)_1$" (both occurrences) to --$(X)_i$--.

Column 3, line 60, change "$(X)_1$" (both occurrences) to --$(X)_i$--.

Column 13, line 50, change "$(X)_1$" (both occurrences) to --$(X)_i$--.

UNITED STATES PATENT AND TRADEMARK OFFICE
CERTIFICATE OF CORRECTION

PATENT NO. : 4,732,921  Page 2 of 2
DATED : March 22, 1988
INVENTOR(S) : Arie Hochberg, Nancy C. Eickman, and Frank Haimbach, IV It is certified that error appears in the above-identified patent and that said Letters Patent is hereby corrected as shown below:

Column 13, line 56, change "$(X)_1$" (both occurrences) to --$(X)_i$--.

Col. 13, line 62, change "brominated" to --halogenated--.

Signed and Sealed this

Second Day of August, 1988

Attest:

DONALD J. QUIGG

Attesting Officer    Commissioner of Patents and Trademarks